United States Patent

Fletcher et al.

[15] 3,694,581

[45] Sept. 26, 1972

[54] DIGITAL SLOPE THRESHOLD DATA COMPRESSOR

[72] Inventors: James C. Fletcher, Administrator of the National Aeronautics and Space Administration with respect to an invention of; Tage O. Anderson, 628 Fairview Ave., Arcadia, Calif. 91006

[22] Filed: May 13, 1971

[21] Appl. No.: 143,078

[52] U.S. Cl. .......................................... 179/15.55 R

[51] Int. Cl. ............................................. H04b 1/66

[58] Field of Search ................ 179/15.55 R, 15.55 T; 325/38 A; 178/DIG. 3

[56] References Cited

UNITED STATES PATENTS

| | | | |
|---|---|---|---|
| 3,598,921 | 8/1971 | Paine | 179/15.55 R |
| 3,369,182 | 2/1968 | Reindl | 179/15.55 R |
| 3,378,641 | 4/1968 | Vargos | 179/15.55 R |
| 3,500,441 | 3/1970 | Brolin | 325/38 A |
| 3,151,296 | 9/1964 | Phyfe | 325/141 |

*Primary Examiner*—Kathleen H. Claffy
*Assistant Examiner*—Jon Bradford Leaheey
*Attorney*—Monte F. Mott, Paul F. McCaul and John R. Manning

[57] ABSTRACT

Apparatus is disclosed for data compression by a decreasing slope threshold test using digital techniques in which the data stream through an input register is examined and only those samples of the raw data are selected for transmission which have a first difference (slope) that exceeds an exponentially decaying threshold function relative to a bias. If a sample is transmitted, it becomes the new bias and a generator of the threshold function is reset. For threshold comparison, the bias is first subtracted from each first difference to produce a second difference for direct comparison of its absolute value with the absolute value of the threshold function, thereby allowing the function generator to run from a constant reference to generate a single sided exponentially decaying function.

4 Claims, 1 Drawing Figure

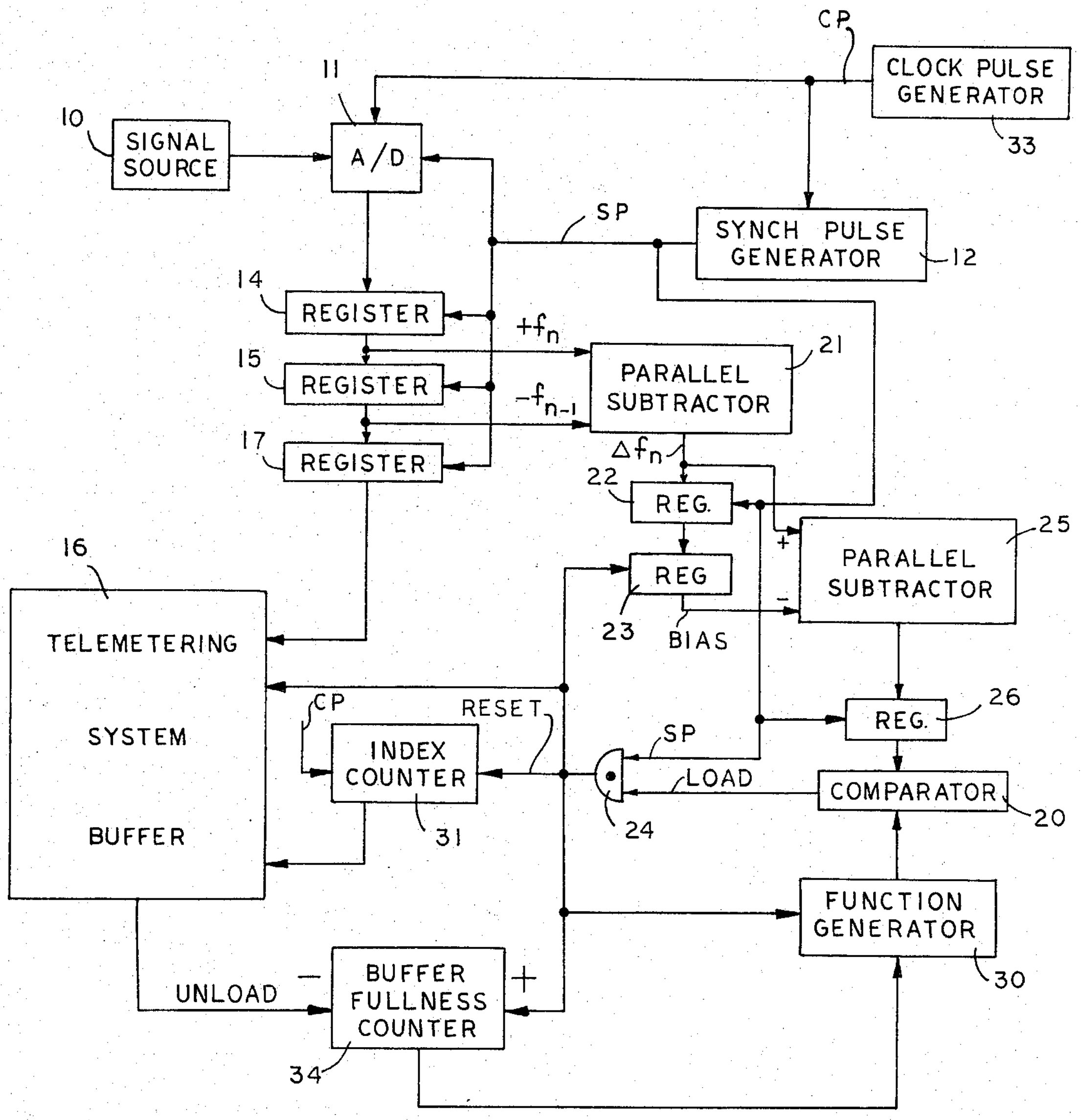
INVENTOR.
TAGE O. ANDERSON
BY
ATTORNEYS.

DIGITAL SLOPE THRESHOLD DATA COMPRESSOR

ORIGIN OF THE INVENTION

The invention described herein was made in the performance of work under a NASA contact and is subject to the provisions of section 305 of the National Aeronautics and Space Act of 1958, Public Law 85–568 (72 State. 435;42 USC 2457).

BACKGROUND OF THE INVENTION

This invention relates to digital apparatus for compression of data to be transmitted, and more particularly to a digital slope threshold data compression system for data redundancy reduction in which the significant change detector operates on first differences and the decision threshold is a function having a continually decreasing slope that is biased to the first difference related to the last accepted sample.

A method and analog apparatus for compression of data by a decreasing slope threshold test is disclosed by Leonard Kleinrock in a copending U.S. Pat. application Ser. No. 813,494 filed Apr. 4, 1969 now U.S. Pat. No. 3,598,921 and titled Method and Apparatus for Data Compression By a Decreasing Slope Threshold Test. The theory of the decreasing slope threshold compression scheme is as follows: If the slope (first difference) of the raw data exceeds the threshold decision reference, the previous actual sample is transmitted. The threshold decision reference is in concept a symmetrical bi-polar exponential decay function that is biased to the first difference related to the last accepted sample.

Mathematically, the method can be described by the following expressions. Let $\{f_n\}$ = raw data sequence $\Delta f_n = f_n - f_{n-1}$ $n_m$ = index of the $m$th transmitted sample When the mth sample has already been transmitted, and the search for the $m = 1$ sample is in progress, the upper and lower threshold $T_U(n)$ and $T_L(n)$ are (for $a \geq 0, b \geq 0$)

$$T_U(n) = \Delta f_{n_m+1} + a \exp[-b(n-n_m-1)]$$

$$T_L(n) = \Delta f_n \quad - a\, exp[-b(n-n_m-1)]$$

Thus, when $$\Delta f_n - T_U(n) \geq 0$$

or when $$\Delta f_n - T_L(n) \leq 0$$

$f_{m-1}$ is sampled and $n_{m+1}$ is set equal to $n-1$.

As each sample is transmitted the content of an index counter is transmitted with its as an "address". The compressed data consisting of transmitted samples and addresses can then be reconstructed at the receiving station. The reconstructed function is a linear interpolation of these samples.

The generation of a bipolar exponentially decaying function, with reference to a bias equal to the last first difference at the time a sample is transmitted, is normally implemented in the analog domain, however, analog circuits often exhibit drift, and require periodic calibration. In a data transmission system with quantized input data, the ultimate comparison with a decaying exponential function can be no more accurate than the function generator. It would therefore be desirable to provide a digital system, with the exponential function generated in the digital domain to the required order of accuracy.

SUMMARY OF THE INVENTION

The present invention comprises digital apparatus for compression of a data stream continuously examined and selected for transmission when the absolute value of the first difference $\Delta f_n$ between successive samples $f_{n-1}$ and $f_n$ exceeds the value of a decaying function with reference to a bias. Upon selection of a sample from the data stream, the first difference $\Delta fn$ is stored to be employed as the bias for the reference in a search of the next sample. At the same time, the generator of the decaying function is reset. As each subsequent first difference is formed, the bias is subtracted from it. The decaying function generator can then operate from a common level during each search period, and comparison is made of the decaying function with second difference between the first differences $\Delta f_n$'s and the stored bias, all in digital form using two cascaded registers as first and second unit delay operators, a first parallel subtractor connected to the first and second registers to form the successive first differences, a second parallel subtractor connected to the first subtractor and a third register to form a second difference between each first difference and a bias stored in said third register, a fourth register for storing each successive first difference, a fifth register for storing each successive second difference, a digital decaying function generator, and a comparator connected to the fifth register and the function generator for comparing each successive second difference with the decaying function. When the second difference exceeds the decaying function, the function generator is reset, the sample $f_{n-1}$ of the first difference $(f_n - f_{n-1})$ is loaded into a telemetering system via a sixth register cascaded with the first two, and the corresponding first difference being held in the fourth register is transferred to the third register to be used as the bias in search of the next sample to be selected for transmission.

The novel features that are considered characteristic of this invention are set forth with particularity in the appended claims. The invention will best be understood from the following description when read in connection with the accompanying drawings.

BRIEF DESCRIPTION OF THE DRAWINGS

The sole FIGURE is a block diagram of a preferred embodiment of the present invention.

DESCRIPTION OF THE PREFERRED EMBODIMENT

Referring now to the drawings, the decreasing slope threshold method of compressing data is implemented in a digital form as shown in FIG. 1. An analog signal from a source 10 is converted into digital form by a conventional analog-to-digital converter 11 synchronized by pulses from a generator 12. The input data stream $\{f_n\}$ is clocked into an input register 14 in response to the synch pulses from the generator 12. In that manner, as the analog-to-digital converter is reset for a new sample, the value of the previous sample is entered into the register 13 in digital form. Consequently, in the input data stream $\{f_n\}$, the subscript n is an index number of the raw data sequence.

The synch pulses from the generator 12 are also applied to the registers 15 and 16 which, function as unit delay operators for transmission of the data stream to a telemetering system buffer 16. The telemetering system buffer is implemented in such a way as to receive the data stream directly from the register 17 in synchronism with pulses from the generator 12, but only when a LOAD signal is being transmitted by a comparator 20.

A first difference $\Delta f_n$ is continually computed by a parallel subtractor 21 connected to the registers 14 and 15 by subtracting the content $(f_{n-1})$ of the register 15 from the content $(f_n)$ of the register 14. As the data stream is advanced through the registers 14 and 15, each new first difference $\Delta f_n$ computed by the subtractor 21 is entered into a buffer register 22 for further processing in accordance with the invention. The output of the register 22 is also connected to a register 23. However, the content of the register 22 is not entered into the register 23 in response to a synch pulse (SP) from the generator 12 unless the comparator 20 is transmitting a LOAD signal. That may be accomplished for example, by using a gate 24 to transmit a synch pulse to the register 23 for the purpose of entering the content of register 22 when an enabling signal is received from the comparator 20. In that manner a first difference $\Delta f_n$ computed by the subtractor 21 using a given sample value $f_{n-1}$ entered into the register 23 when that given sample has reached the system buffer, but only if the comparator 20 has generated a LOAD signal to cause the content of the output register 17 to be transferred to the telemetering system buffer 16. Accordingly, while a LOAD signal is not being generated, the stream of data being entered in the output register 17 is discarded, and the last first difference entered into the register 23 is held as a BIAS signal to be used as a reference for an exponentially decaying function of the decreasing slope threshold method of compressing data.

This decreasing slope threshold method of compressing data requires that a symmetrical bipolar exponential function be generated with reference to the value of the first difference $\Delta f_n$ for the last sample $f_{n-1}$ selected for transmission. Therefore, the data stream is continually monitored. When the first difference between two successive samples exceeds the exponential function, it is entered into the register 23, and, of the samples forming the first difference, the sample $f_{n-1}$ is selected for transmission.

To simplify implementation of that data compression method using digital techniques, the content of the register 23 is subtracted from the stream of first differences being entered in the register 22 using a subtractor 25. The exponentially decaying function required by the slope threshold data compression method is then implemented as a function generator of only one polarity with reference to a common value (zero) which remains constant. Thus, to simplify the comparison required by the decreasing slope threshold data compression method for both the positive and negative branches of a decaying function, the reference for the bipolar decaying function held in the register 23 is first subtracted from the stream of first differences being compared with the bipolar decaying function. To assure that the first difference is always positive, a binary 1 is added in the most significant position of the subtractor 21 which is one order higher than the most significant bit of the register 14. For example, assuming a seven bit absolute value number plus a sign bit from the converter 11, an eight bit absolute value number plus sign is applied to the subtractor 21 with a bit 1 in the most significant bit position. That assures that the first difference $\Delta f_n$ effectively computed as follows:

$$f_n+2^n)-f_{n-1}=f_n+2^n$$

where $2^n$ is the bit 1 inserted in the $n$th bit position. The excess $2^n$ subtracts itself out of the second difference because a given first difference having an excess $+2^n$ stored in the register 23 is subtracted from subsequent first differences each of which have an excess $+2^n$. The same technique can be used to assure the output of the subtractor 25 is also always positive, and to effectively cancel the excess in each second difference, that excess can be added to each value from a unipolar function generator 30. Still other techniques may be employed to form the first and second differences, and to compare the absolute values of the second differences with the absolute values of the unipolar function generator 30. In that manner, a first difference $\Delta f_n$ for a given sample $f_{n-1}$ is effectively compared to both branches of a bipolar exponentially decaying function as required by the decreasing slope threshold method of data compression.

The time delay of one synch pulse period between the formation of a given set of first and second differences and the time a comparison is being made is compensated in the data stream channel by the register 17. Thus, while a first difference is being stored in a buffer register 22 and a second difference is being stored in the register 26 for a pair of samples $f_n$ and $f_{n-1}$, in registers 14 and 15, the samples are being advanced to the registers 15 and 17, respectively. If a LOAD signal is generated as a result of the second difference exceeding the function in absolute value, the first difference is entered into the register 23 while the sample $f_{n-1}$ in the register 17 is entered into the system buffer 16 in response to a synch pulse gated through a gate 24.

The function generator 30 is implemented with digital circuits, rather than analog circuits, because the digital circuits are inherently more accurate than analog circuits and, as noted hereinbefore, the ultimate accuracy of the data compression system can be nor more accurate than the accuracy of the analog-to-digital converter 11 and the function generator 30.

As each sample is selected for transmission through the telemetering system buffer 16 by the comparator 20, the content of an index register 31 is transferred to the system buffer 16, while at the same time the index counter 31 is reset. The index counter then begins to count clock pulses (CP) from a clock pulse generator 33 to provide an index number for a subsequent sample selected for transmission. Thus, as each sample is selected for transmission, a load signal enables the contents of the output register 17 and the index counter 31 to be entered into the system buffer using the synch pulse (SP) transmitted by the gate 24 in response to a LOAD signal. The same gated synch pulse resets the index counter. The system buffer 16 may include a magnetic core memory to store the paired contents of a register 17 and the counter 31 until time is available for transmission. In that manner the transmission may be at a constant rate while samples are accepted for transmission intermittently.

Each synch pulse transmitted through the gate 24 also resets the function generator 30 and increments a buffer fullness counter 34. As a sample of data received by the telemetering buffer 16 is transmitted to the ground station, a pulse is transmitted to the buffer fullness counter 34 to decrease the count stored therein by one unit. In that manner, the buffer fullness counter (which may be implemented by a conventional up-down counter) will continuously provide an indication of the fullness of the telemetering system buffer 16. If the system buffer reaches a state of near fullness, it will overflow unless the criteria for selecting data is altered. Therefore, the content of the buffer fullness counter 34 is used to alter the operation of function generator 30 to provide a function to the comparator 20 that decays more slowly or starts at a higher level when the buffer fullness counter exceeds a given level. Then, for example, when the buffer fullness status decreases to below that given level the rate at which the function of the generator 30 decreases can be increased. At the same time, the buffer fullness status signal is entered in the system buffer as a part or field of each index word to indicate to the receiving station the criteria currently being used for data being entered into the system buffer.

Various techniques may be used to implement the function generator 30. For example, the function generator may use the table look-up concept with read-only memory and a counter which is preset to a given number by a pulse from the gate 24. As clock pulses increment the counter, successive values of the function are read from memory starting with the address specified by the number to which the counter is preset by the synch pulse from the gate 24. As the status of the telemetering system buffer changes, the number to which the counter of the table look-up system is preset by a synch pulse from the gate 24 may be increased, or decreased, to start generation of the next function from a different location in memory.

Because the function generator must provide a continually decaying threshold value for the comparator 20 until a first difference of a sample exceeds it, implementation using the table look-up concept may, in some applications, require too many memory locations, depending upon the expected maximum time between selection of samples. Accordingly, implementation of the function generator 30 is preferably such that the functions may continue to decay exponentially over a virtually indefinite period of time.

The preferred method for generating the exponential function to any desired degree of accuracy employs only simple counters and gating logic as is more fully described in a copending application, filed Mar. 19, 1970, (Ser. No. 21,508) titled Digital Quasi-Exponential Function Generator. The technique for the generation of the function is to count down a function counter in response to clock pulses (CP) from the generator 33 and to vary the clock pulse rate in such a manner that the value of the counter decreases exponentially with time. The initial value in the counter is preset to a desired value for the state of the buffer fullness counter, and the time constant of the exponential function, a function of pulse rate is also controlled by the buffer fullness counter 34. The pulses applied to the function counter are effectively derived from a pulse rate multiplier circuit, and the pulse rate multiplier is continually altered as a function of time by a logic network whose input is the function counter. The one logic network will then serve all exponential decay functions to be selected, and the selection of a given one by the buffer fullness counter is accomplished by selecting the preset value and time constant, i.e., and basic pulse rate.

It should be noted that the slope of an exponential decay function at any point in time is proportional to the amplitude at that time. In particular, the slope when the counter is at full scale, is twice the slope at ½ scale, which is, in turn, twice the slope at ¼ scale, etc. Furthermore, the shape of the curve from full scale to ½ scale is exactly the same as from ½ scale to ¼ scale, except for a factor of two in slope. Therefore, a counter that decays exponentially from full scale to ½ scale will also decay exponentially from ½ scale to ¼ scale if the clock rate is halved.

In this implementation of the function generator, the range of the counter is divided into a number of fields according to the value in the counter, and the clock rate for each field is ½ of that for the preceding field, as follows:

full to ½ scale — full clock rate applied
½ to ¼ scale — ½ clock rate applied
¼ to ⅛ scale — ¼ clock rate applied
⅛ to 1/16 scale — ⅛ clock rate applied In order to approximate the exponential function within a field, each field is divided into several subfields. This is accomplished by dividing the basic clock by a different number for each subfield, thus determining the slope for that subfield. The slope in each subfield is proportional to the inverse of the number by which the basic clock is divided. Sufficient accuracy for the present function generator is considered to be obtained by dividing each field into three subfields.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for compression of a data stream of periodic samples of a variable signal in digital form to be transmitted through a telemetering system buffer comprising:

means for generating a train of pulses synchronized with said data stream, one pulse for each sample of data;

first and second storage means responsive to said train of pulses for receiving said data stream in cascade whereby said first storage means holds a given sample $f_n$ while said second storage means holds a preceding sample $f_{n-1}$, where the subscript n is a notation indicating the sample is the $n$th one in a series;

first subtracting means connected to said first and second storage means for subtracting said sample $f_{n-1}$ in said second storage means from said sample $f_n$ in said first storage means to thereby produce in digital form a first difference;

third storage means for receiving and storing a bias value in digital form;

second subtracting means connected to said first subtracting means and said third storage means for subtracting said bias value from said first difference to thereby produce in digital form a second difference;

fourth and fifth storage means responsive to said train of pulses for receiving each successive first and second difference in digital form, respectively;

means for producing a predetermined decaying function in digital form;

means for continually comparing values of said function with successive second difference values in said fifth storage means, and for producing a control signal when a second difference value exceeds a contemporaneous value of said function;

sixth storage means responsive to said train of pulses for translating successive samples of said data stream to said system buffer from said second storage means; and transfer control means responsive to said control signal and said train of pulses for causing a contemporaneous sample in said sixth storage means to be entered into said system buffer, and for causing a contemporaneous first difference to be entered into said third storage means as a bias value.

2. Apparatus as defined by claim 1 including:

timing means for providing an index number in digital form representing lapsed time following a sample selected for entry into said system buffer; and means responsive to said transfer control means for entering the content of said counting means into said system buffer while simultaneously causing said contemporaneous sample in said sixth storage means to be entered into said system buffer and resetting said timing means, thereby providing to said system buffer a number associated with a sample entered into said system buffer, said number indicating lapsed time from a preceding sample entered into said system buffer.

3. Apparatus for compression of data to be transmitted through a system buffer using a decreasing-slope threshold test comprising:

means for converting a continuously varying input signal into a data stream of periodic samples in digital form;

first, second and output registers connected in cascade to receive said data stream in digital form, whereby said first register holds a given sample $f_n$ while said second register holds a preceding sample $f_{n-1}$, where the subscript $n$ is a notation indicating the sample is the nth one in a series, and said output register holds said sample $f_{n-1}$ during a succeeding sample period;

first subtracting means connected to said first and second registers for subtracting said sample $f_{n-1}$ in said second register from said sample $f_n$ in said first register to thereby produce in digital form a first difference;

a third register for holding a bias value in digital form;

second subtracting means connected to said first subtracting means and said third register for subtracting said bias value from said first difference to thereby produce in digital form a second difference;

a fourth register for holding each successive first difference produced in digital form by said first subtracting means;

a fifth register for holding each successive second difference produced in digital form by said second subtracting means;

means for producing a unipolar function having successive periodic values in digital form decaying from a predetermined starting value;

means for comparing each successive second difference with the current value of said function, and for producing a control signal when a second difference exceeds a contemporaneous value of said function; and means responsive to said control signal for causing a contemporaneous sample in said output register to be transferred into said system buffer.

4. Apparatus as defined by claim 1 including:

a source of clock pulses;

means for counting said clock pulses to provide an index number in digital form representing lapsed time between successive samples selected for transfer into said system buffer in response to said control signal; and means responsive to said control signal for entering the content of said counting means into said system buffer while simultaneously resetting said counting means to zero, thereby providing to said system buffer a number associated with a sample entered into said system buffer, said number indicating lapsed time from a preceding sample entered into said system buffer.

* * * * *